(12) United States Patent
Lee et al.

(10) Patent No.: US 7,717,105 B2
(45) Date of Patent: May 18, 2010

(54) GAS RADIATION BURNER

(75) Inventors: Dae Rae Lee, Gimhae-si (KR); Jung Wan Ryu, Changwon-si (KR); Dae Bong Yang, Jinhae-si (KR); Young Soo Kim, Changwon-si (KR); Yang Ho Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 274 days.

(21) Appl. No.: 11/649,240

(22) Filed: Jan. 4, 2007

(65) Prior Publication Data

US 2007/0202451 A1    Aug. 30, 2007

(30) Foreign Application Priority Data

Jan. 6, 2006    (KR) ................ 10-2006-0001792
Jan. 20, 2006    (KR) ................ 10-2006-0006427

(51) Int. Cl.
*F23D 14/12*    (2006.01)
*F23D 14/14*    (2006.01)
*F24C 3/04*    (2006.01)

(52) U.S. Cl. ............... 126/39 J; 126/39 K; 431/170; 431/173; 431/328; 431/354

(58) Field of Classification Search .......... 431/328, 431/329, 278–285, 354, 173, 170; 126/39 E, 126/39 H, 39 N, 39 J, 39 K
See application file for complete search history.

(56) References Cited

U.S. PATENT DOCUMENTS 3,077,922 A * 2/1963 Soncie .............. 431/283
3,437,085 A * 4/1969 Perry ................ 126/21 A
3,468,298 A * 9/1969 Teague, Jr. et al. ......... 126/39 J
3,470,862 A * 10/1969 Morse et al. .............. 126/39 J
3,494,350 A * 2/1970 Perl .................. 126/39 J
3,606,612 A * 9/1971 Reid, Jr. ............... 431/281

(Continued)

FOREIGN PATENT DOCUMENTS

CN    1547923 A    11/2004

(Continued)

*Primary Examiner*—Carl D Price
(74) *Attorney, Agent, or Firm*—Birch, Stewart, Kolasch & Birch, LLP

(57) ABSTRACT

A gas radiation burner for improving the efficiency of burning by promoting mixing of fuel gas and air is disclosed. The gas radiation burner includes a gas supply member for injecting gas, at least one mixing pipe for suctioning air along with the gas injected from the gas supply member to produce mixture gas and injecting the produced mixture gas, a burner pot for receiving the mixture gas supplied from the mixing pipe, a burner mat mounted at a top of the burner pot and adapted to emit radiation heat that is generated as the mixture gas supplied from the burner pot burns on the burner mat, and a burner housing located on a top of the burner mat and defining a burning chamber therein. The mixing pipe is connected to a predetermined position of a lateral portion of the burner pot such that the mixture gas supplied from the mixing pipe flows along an inner peripheral surface of the burner pot.

4 Claims, 7 Drawing Sheets

U.S. PATENT DOCUMENTS

| | | | | |
|---|---|---|---|---|
| 3,633,562 A | * | 1/1972 | Morse et al. | 126/39 J |
| 3,804,578 A | * | 4/1974 | Robbins | 431/158 |
| 3,843,313 A | * | 10/1974 | Helgeson | 431/329 |
| 4,083,355 A | * | 4/1978 | Schwank | 126/39 J |
| 5,197,872 A | * | 3/1993 | Bertomeu Martinez | 431/284 |
| 5,295,476 A | * | 3/1994 | Herbert | 126/39 G |
| 5,342,192 A | * | 8/1994 | Hirano | 431/284 |
| 5,816,235 A | * | 10/1998 | Kim et al. | 126/39 H |
| 6,322,354 B1 | * | 11/2001 | Carbone et al. | 431/284 |

FOREIGN PATENT DOCUMENTS

| | | |
|---|---|---|
| GB | 2 231 950 A | 11/1990 |
| JP | 62-155428 A | 7/1987 |
| JP | 9-178126 A | 7/1997 |
| JP | 2001-41421 A | 2/2001 |
| KR | 1997-63252 U | 12/1997 |
| KR | 2003-76248 A | 9/2003 |

* cited by examiner

GAS RADIATION BURNER

This application claims the benefit of the Korean Patent Application No. 10-2006-0001792 filed on Jan. 6, 2006 and No. 10-2006-0006427 filed on Jan. 20, 2006, which is hereby incorporated by reference as if fully set forth herein.

BACKGROUND OF THE INVENTION

1. Field of the Invention

The present invention relates to a gas radiation burner, and more particularly, to a gas radiation burner capable of improving the efficiency of burning by promoting mixing of fuel gas and air.

2. Discussion of the Related Art

In general, a gas radiation burner is a burner in which an object to be heated is heated and cooked by radiation energy that is generated when a radiator is heated by burning of mixture gas produced by mixing fuel gas and air.

Hereinafter, a conventional gas radiation burner will be described with reference to the accompanying drawings.

FIG. 1 is a plan view schematically illustrating a conventional gas radiation burner, and FIG. 2 is a sectional view taken along the line I-I of FIG. 1.

As shown in FIGS. 1 and 2, the conventional gas radiation burner basically includes a mixing pipe 1, a burner pot 2, a burner mat 3, a burner housing 4, and a glass 5.

Here, the mixing pipe 1 internally defines a space in which fuel gas and air are introduced and mixed primarily. The fuel gas is injected from a nozzle 1a and introduced into the mixing pipe 1. The air is introduced into the mixing pipe 1 by an injection pressure of the fuel gas and mixed, along with the fuel gas, in the mixing pipe 1, so as to produce mixture gas.

The burner pot 2 is connected to the mixing pipe 1, and internally defines a space in which the mixture gas from the mixing pipe 1 is introduced and burns. The burner pot 2 has a function of accomplishing more uniform mixing of the fuel gas and the air contained in the mixture gas that is introduced from the mixing pipe 1 into the burner pot 2.

The burner mat 3 is mounted on a seating portion 2a that is formed at a top of the burner pot 2. The burner mat 3 has a function of emitting radiation energy that is accumulated in the burner mat 3 as the mixture gas burns on the burner mat 3.

The burner housing 4 serves as a body of the gas radiation burner. The burner pot 2 is coupled to the burner housing 4.

In this case, the burner housing 4 has a circular opening 4a for passage of the radiation energy emitted from the burner mat 3.

The glass 5 is mounted at a top of the burner housing 4. An object to be heated is put on the glass 5.

Meanwhile, the burner housing 4 has an exhaust duct F serving as a passage for drawing out exhaust gas that is produced as the mixture gas burns.

The operation of the gas radiation burner having the above described configuration will now be described.

First, if an object to be heated is put on an upper surface of the glass 5 and the gas radiation burner is operated by a user, fuel gas and air are introduced into and mixed in the mixing pipe 1. The resulting mixture gas is supplied into the burner pot 2 and ejected through the burner mat 3.

Simultaneously, the mixture gas is ignited by a predetermined igniter (not shown) such that the mixture gas burns on the burner mat 3. As the mixture gas burns, heat is accumulated in the burner mat 3, thus causing the burner mat 3 to emit radiation energy.

Thereby, the object to be heated, which is put on the upper surface of the glass 5, is able to be heated and cooked by the radiation energy generated as stated above.

In this case, exhaust gas, which is produced after burning of the mixture gas, has a temperature of approximately 500 degrees Celsius or more. The exhaust gas is discharged through the exhaust duct F provided in the burner housing 4.

However, the conventional gas radiation burner has problems as follows.

Firstly, the mixture gas flows straightly upward within the burner pot 2 and this causes uneven burning of the mixture gas on the surface of the burner mat 3.

Therefore, there are problems of a degradation in the efficiency of radiation due to incomplete burning of the mixture gas and an increase in the amount of exhaust gas.

Secondly, if the mixing pipe 1 has a reduced length due to installation structural restrictions thereof, the mixing pipe 1 may cause uneven mixing of fuel gas and air within the mixing pipe 1 and consequently, incomplete burning of the mixture gas. This causes a further degradation in the efficiency of radiation as well as a further increase in the amount of exhaust gas.

Thirdly, the conventional gas radiation burner is difficult to be used as a built-in product.

When the burner pot 2 has a reduced size, more particularly, a reduced height according to the tendency of built-in home appliances, the burner pot 2 is difficult to guarantee uniform mixing of the mixture gas introduced into the burner pot 2 and the mixture gas cannot be ejected uniformly through the burner mat 3. This causes incomplete burning of the mixture gas, resulting in a degradation in the efficiency of radiation as well as an increase in the amount of exhaust gas.

Fourthly, a variable regulation in the quantity of heat is impossible because of restrictions in relation with introduction of the mixture gas into the burner pot 2 and a burning space.

SUMMARY OF THE INVENTION

Accordingly, the present invention is directed to a gas radiation burner that substantially obviates one or more problems due to limitations and disadvantages of the related art.

An object of the present invention is to provide a gas radiation burner capable of improving the efficiency of burning of mixture gas by promoting mixing of fuel gas and air contained in the mixture gas while enabling a variable regulation in the quantity of heat.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a gas radiation burner comprises: a gas supply member for injecting gas; at least one mixing pipe for suctioning air along with the gas injected from the gas supply member to produce mixture gas and injecting the produced mixture gas; a burner pot for receiving the mixture gas supplied from the mixing pipe; a burner mat mounted at a top of the burner pot and adapted to emit radiation heat that is generated as the mixture gas supplied from the burner pot burns on the burner mat; and a burner housing located on a top of the burner mat and defining a burning chamber therein, wherein the mixing pipe is connected to a predetermined position of a lateral portion of the burner pot such that the mixture gas supplied from the mixing pipe flows along an inner peripheral surface of the burner pot.

In accordance with another aspect of the present invention, there is provided a gas radiation burner comprising: a gas supply member for injecting gas; at least one mixing pipe for suctioning air along with the gas injected from the gas supply member to produce mixture gas and injecting the produced mixture gas; a burner pot for receiving the mixture gas supplied from the mixing pipe; a burner mat obliquely mounted at a top of the burner pot and adapted to emit radiation heat that is generated as the mixture gas supplied from the burner pot burns on the burner mat; and a burner housing located on a top of the burner mat and defining a burning chamber therein.

In accordance with yet another aspect of the present invention, there is provided a gas radiation burner comprising: a gas supply member for injecting gas; a plurality of mixing pipes for suctioning air along with the gas injected from the gas supply member to produce mixture gas and injecting the produced mixture gas; a burner pot for receiving the mixture gas supplied from the mixing pipes; a burner mat obliquely mounted at a top of the burner pot and adapted to emit radiation heat that is generated as the mixture gas supplied from the burner pot burns on the burner mat; and a burner housing located on a top of the burner mat and defining a burning chamber therein, wherein the burner pot defines a plurality of individual spaces therein, and at least one of the mixing pipes is connected to each of the plurality of spaces.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a gas radiation burner according to the present invention will be described in more detail with reference to the accompanying drawings.

Figure 1:
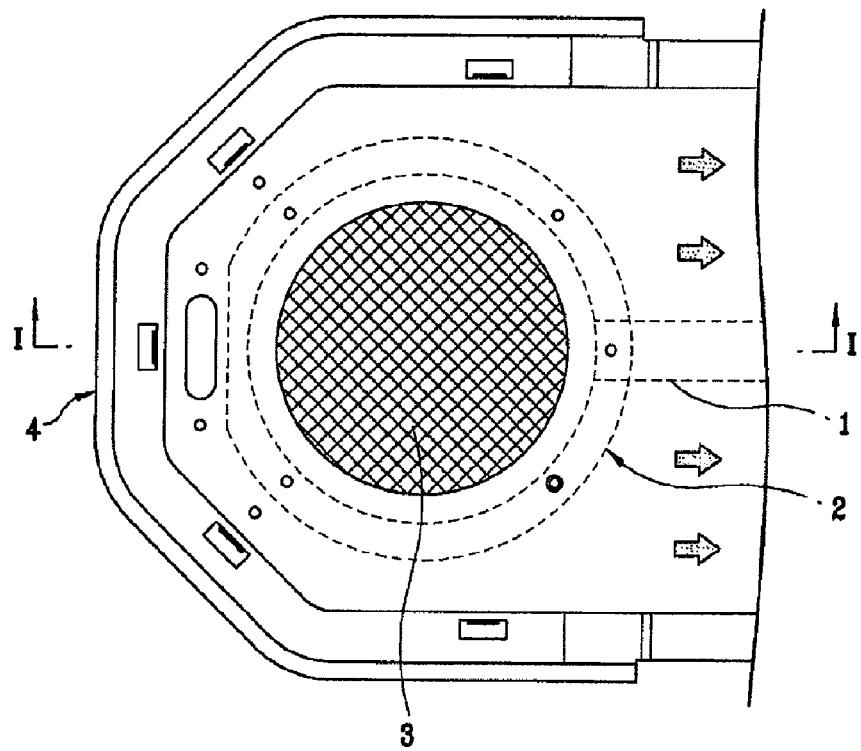
FIG. 1 is a plan view schematically illustrating a conventional gas radiation burner.
Figure 2:
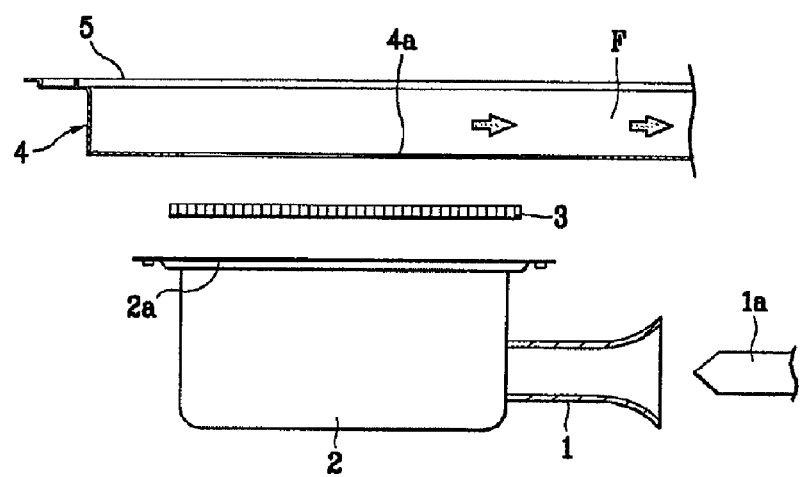
FIG. 2 is a sectional view taken along the line I-I of FIG. 1.
Figure 3:
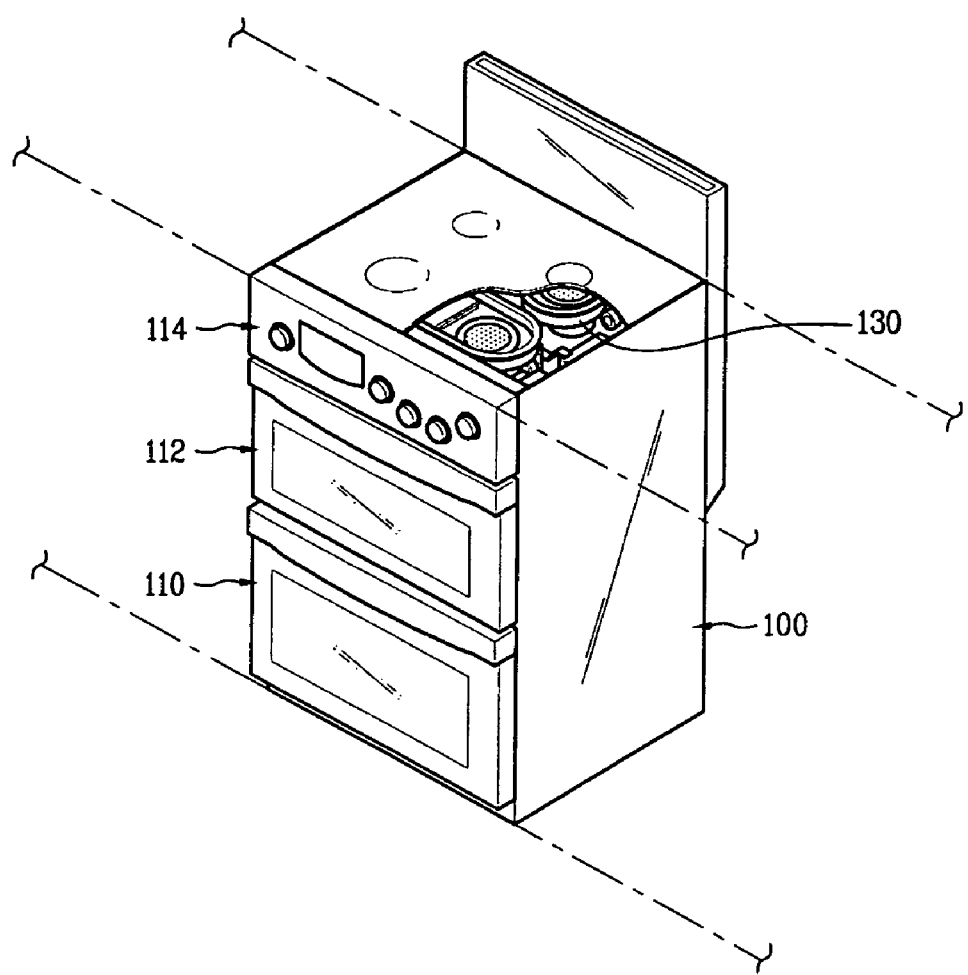
FIG. 3 is a perspective view illustrating a gas oven having a gas radiation burner according to an embodiment of the present invention.

First, a gas oven, in which the gas radiation burner according to the present invention is employed, will be described with reference to FIG. 3. FIG. 3 is a view illustrating an example of a built-in type gas oven.

As shown in the drawing, the gas oven includes a body 100, an oven unit 110, a grill unit 112, and a top burner unit 114 having a plurality of gas radiation burners 130.

The body 100 defines the outer appearance of the gas oven. The oven unit 110 is located in a lower region of the body 100 and has a space in which food is cooked by convection heat from a plurality of heaters (not shown) that are mounted in the oven unit 110. The grill unit 112 has a space in which food of, for example, fish and meat, is cooked by radiation heat mainly.

The gas radiation burners 130 are provided on a top of the body 100 and serve as means for cooking food by heating a container in which the food is received. A glass (as designated by reference numeral 137, See FIG. 4) is fitted in an upper opening of each radiation burner 130. The glass is mainly formed by a ceramic material.

Figure 4:
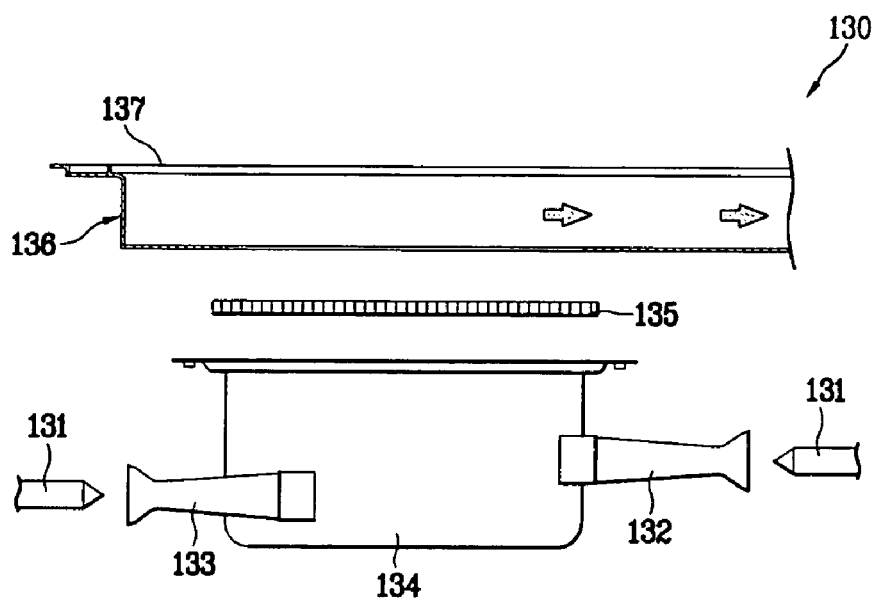
FIG. 4 is a sectional view illustrating a gas radiation burner according to a preferred first embodiment of the present invention.
Figure 5:
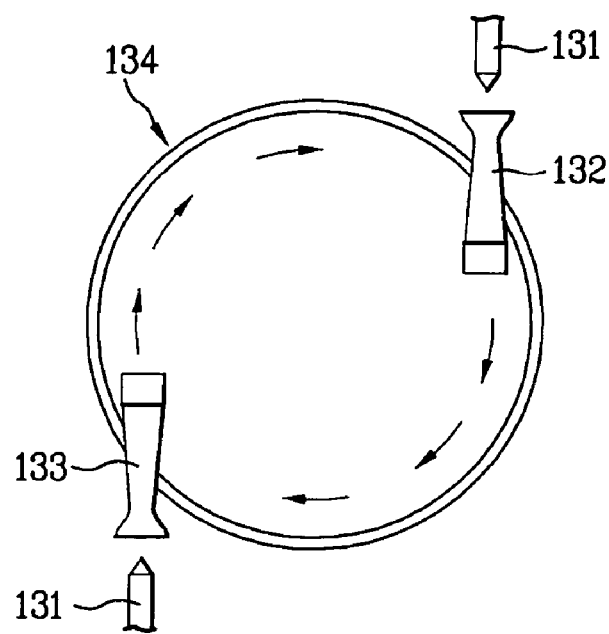
FIG. 5 is a plan view schematically illustrating the connecting structure of mixing pipes and a burner pot shown in FIG. 4.

FIG. 4 is a sectional view illustrating a gas radiation burner according to a preferred first embodiment of the present invention, which is suitable for being applied in the gas oven of FIG. 3. FIG. 5 is a plan view schematically illustrating the connecting structure of mixing pipes and a burner pot shown in FIG. 4.

Referring to FIGS. 4 and 5, each gas radiation burner 130 according to the present embodiment includes a nozzle 131, mixing pipes 132 and 133, a burner pot 134, a burner mat 135, a burner housing 136, and the glass 137. If fuel gas is injected, through the nozzle 131, into the mixing pipes 132 and 133 along with air, the fuel gas and the air are mixed in the mixing pipes 132 and 133. The resulting mixture gas is supplied into the burner pot 134. As the mixture gas supplied from the burner pot 134 burns on the burner mat 135, the burner mat 135 is heated to thereby emit radiation heat. The burner housing 136 internally defines a burning chamber and the glass 137 is mounted at a top of the burner housing 136.

In the gas radiation burner 130 according to the present embodiment having the above described configuration, the burner pot 134, the burner mat 135, the burner housing 136, and the glass 137 have the same functions as those of a conventional gas radiation burner, and only the mixing pipes 132 and 133 have differentiated features from those of the conventional gas radiation burner. Accordingly, the following description focus on the mixing pipes.

As shown in FIGS. 4 and 5, the mixing pipes 132 and 133 of the gas radiation burner 130 according to the present embodiment may be connected to predetermined positions of a lateral portion of the burner pot 134. Preferably, the mixing pipes 132 and 133 are installed such that the mixture gas supplied from the mixing pipes 132 and 133 flows along an inner peripheral surface of the burner pot 134. For this, preferably, the mixing pipes 132 and 133 are connected to the burner pot 134 such that the mixing pipes 132 and 133 are located adjacent to the inner peripheral surface of the burner pot 134. More preferably, the mixing pipes 132 and 133 are connected to the burner pot 134 in the direction of a tangent. With this configuration, as shown in FIG. 5, if the mixture gas is introduced, through the mixing pipes 132 and 133, into the burner pot 134, the fuel gas and the air of the introduced mixture gas are able to be more efficiently mixed with each other while flowing along the inner peripheral surface of the burner pot 134. Here, although the mixing pipes 132 and 133 may be connected to the burner pot 134 after being prefabricated separately, it is preferable that the mixing pipes 132 and 133 be integrally formed with the burner pot 134.

The gas radiation burner 130 according to the present embodiment includes two mixing pipes of, for example, a first mixing pipe 132 and a second mixing pipe 133, but the present invention is not limited thereto. That is to say, a single mixing pipe may be provided, or two or more mixing pipes may be provided.

In the case where two or more mixing pipes are provided like the present embodiment, as shown in FIG. 5, the first and second mixing pipes 132 and 133 are preferably arranged such that the mixture gas supplied from the mixing pipes 131 and 132 flows, along the inner peripheral surface of the burner pot 134, in a direction. If the mixture gas supplied from the mixing pipe 131 has a different flow direction from that supplied from the mixing pipe 132, there is a problem in that the overall mixture gas supplied into the burner pot 134 has a degradation in the efficiency of flow. More preferably, as shown in FIG. 5, the first and second mixing pipes 132 and 133 may be connected to the burner pot 134 such that the first and second mixing pipes 132 and 133 are symmetrical with each other. With the symmetrical arrangement of the mixing pipes 132 and 133, the mixture gas supplied into the burner pot 134 can flow more efficiently along the inner peripheral surface of the burner pot 134. This has the effect of promoting mixing of the fuel gas and the air.

In conclusion, the gas radiation burner 130 according to the present embodiment has the effect of promoting more uniform mixing of the fuel gas and the air contained in the mixture gas that is supplied from the first and second mixing pipes 132 and 133 into the burner pot 134 by allowing the mixture gas to flow along the inner peripheral surface of the burner pot 20. Increasing the mixing uniformity of the mixture gas causes uniform and stable burning of the mixture gas on a surface of the burner mat 135, resulting in an improvement in the efficiency of radiation and reducing the amount of exhaust gas.

Further, with the adoption of a multiple injection structure using the first mixing pipe 132 and the second mixing pipe 133, it is possible to realize a high Turn Down Ratio (TDR) and to achieve uniform mixing of the mixture gas even when the burner pot 134 has a reduced size (i.e. a reduced height). Accordingly, the gas radiation burner 130 according to the present embodiment is suitable for being applied in a built-in product.

Figure 6:
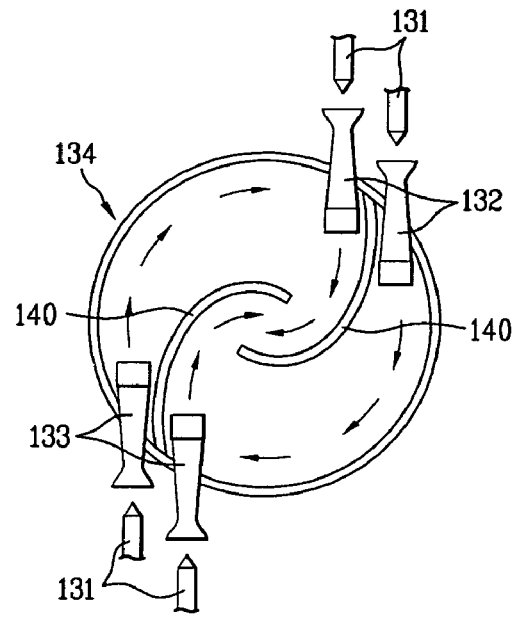
FIG. 6 is a plan view schematically illustrating important parts of a gas radiation burner according to a second embodiment of the present invention.

Now, a second embodiment of the gas radiation burner according to the present invention will be described with reference to FIG. 6. FIG. 6 is a plan view schematically illustrating important parts of the gas radiation burner according to the second embodiment of the present invention. As compared to that of the previously described embodiment, the gas radiation burner 130 according to the present embodiment has a difference in that a plurality of first mixing pipes 132 and a plurality of second mixing pipes 133 are provided and mixing promotion members 140 are further provided, but other configurations and reference numerals refer to those of the previously described embodiment.

As shown in FIG. 6, the gas radiation burner 130 according to the present embodiment may further include the plurality of first mixing pipes 132 and the plurality of mixing pipes 133, which are connected to predetermined positions of the lateral portion of the burner pot 134, and the mixing promotion members 140, respectively, located near the outlet side of the first mixing pipes 132 and near the outlet side of the second mixing pipes 133, the mixing promotion members 140 serving to promote the mixing of the fuel gas and the air of the mixture gas supplied into the burner pot 134. The mixing promotion members 140 may be installed to protrude upward from an inner bottom surface of the burner pot 134 by a predetermined length.

Preferably, the mixing promotion members 140 are arranged, respectively, between the plurality of first mixing pipes 132 and between the plurality of second mixing pipes 133. With this arrangement, the mixture gas, supplied from the first mixing pipes 132 and the second mixing pipes 133, is able to flow more efficiently by the mixing promotion members 140 and this has the effect of promoting the mixing of the fuel gas and the air of the mixture gas supplied into the burner pot 134.

More preferably, the mixing promotion members 140 have a streamline shape corresponding to a curved direction of the inner peripheral surface of the burner pot 134. With this configuration, the mixture gas, supplied from the first mixing pipes 132 and the second mixing pipes 133, is able to flow more efficiently along the inner peripheral surface of the burner pot 134 and along the mixing promotion members 140. This has the effect of promoting more uniform mixing of the fuel gas and the air.

In conclusion, with the adoption of the mixing promoting members 140, the gas radiation burner 130 according to the present embodiment can achieve more efficient flow of the mixture gas supplied into the burner pot 134 as compared to the above described first embodiment, and can promote more uniform mixing of the fuel gas and the air.

Figure 7:
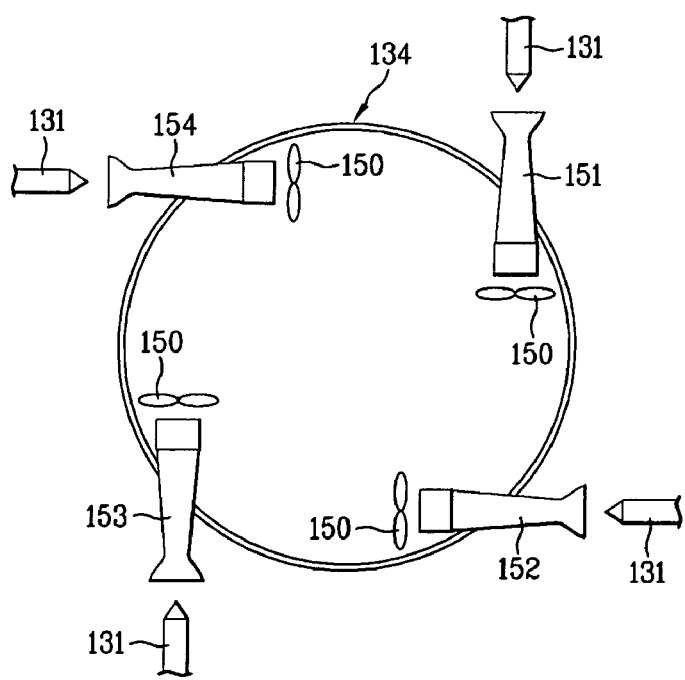
FIG. 7 is a plan view schematically illustrating important parts of a gas radiation burner according to a third embodiment of the present invention.

Next, a third embodiment of the gas radiation burner according to the present invention will be described with reference to FIG. 7. FIG. 7 is a plan view schematically illustrating important parts of the gas radiation burner according to the third embodiment of the present invention. As compared to those of the previously described embodiments, the gas radiation burner 130 according to the present embodiment has a difference in that a plurality of mixing pipes are connected to the burner pot 134 so as to be symmetrical with one another and flow promotion members 150 are further provided, but other configurations and reference numerals refer to those of the previously described embodiments.

As shown in FIG. 7, the gas radiation burner 130 according to the present embodiment may further include four mixing pipes 151, 152, 153, and 154, which are connected to the burner pot 134 so as to be symmetrical with one another, and the flow promotion members 150 for promoting the flow of the mixture gas discharged from the four mixing pipes.

Preferably, the flow promotion members 150 are fans having one side for suctioning the mixture gas that is supplied from the four mixing pipes into the burner pot 134 and the other side for discharging the suctioned mixture gas. More preferably, the fans are provided, respectively, in the vicinity of outlet ends of the respective mixing pipes. With this configuration, if the mixture gas is supplied from the mixing pipes into the burner port 134, the mixture gas is forcibly moved by the flow promotion members 150, i.e. the fans, thereby achieving more efficient flow of the mixture gas. This consequently promotes more uniform mixing of the fuel gas and the air of the mixture gas.

Although the gas radiation burner 130 according to the present embodiment includes four mixing pipes, the present invention has no limit in the number of the mixing pipes. Also, similar to the above described first embodiment, preferably, the plurality of mixing pipes are arranged such that the mixture gas supplied from the mixing pipes flows in a direction along the inner peripheral surface of the burner pot 134.

Figure 8:
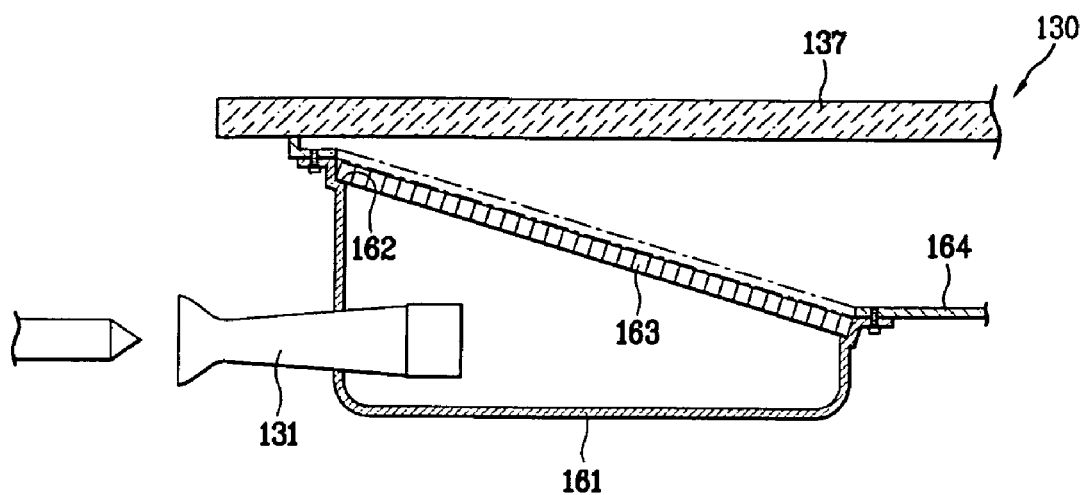
FIG. 8 is a sectional view schematically illustrating important parts of a gas radiation burner according to a fourth embodiment of the present invention.

A fourth embodiment of the gas radiation burner according to the present invention will now be described with reference to FIG. 8. FIG. 8 is a sectional view schematically illustrating important parts of the gas radiation burner according to the fourth embodiment of the present invention. As compared to the above described embodiments, the gas radiation burner 130 according to the present embodiment has a difference in relation with configurations of the burner pot 134 and the burner mat 135, but other configurations and reference numerals refer to those of the previously described embodiments.

As shown in FIG. 8, the gas radiation burner 130 according to the fourth embodiment of the present invention may include a burner mat 163, which is obliquely mounted at a top of a burner pot 161. Here, the burner pot 161 may be perforated with a top opening 162, which defines an inclined plane for allowing the burner mat 163 to be obliquely mounted to the burner pot 161.

The burner pot 161 is coupled to a burner housing 164 after being previously coupled with the burner mat 163. In this case, preferably, a coupling region of the burner pot 161 adjacent to the glass 137 has a small coupling force, whereas an opposite coupling region of the burner pot 161 (the right side of FIG. 8) has a large coupling force. This is to substantially prevent the coupling force of the burner pot 161 from being transmitted to the glass 137 and consequently, to prevent deformation of the glass 137. Of course, it will be appreciated that one side of the burner pot 161 may be directly coupled to the glass 137 and the other side of the burner pot 161 may be coupled to the burner housing 164.

In conclusion, as a result of obliquely installing the burner mat 130 such that one side of the burner pot 161 is located close to the glass 137, the gas radiation burner 130 according to the present embodiment has the effect of reducing a height difference between the glass 137 and the burner pot 161.

Figure 9:
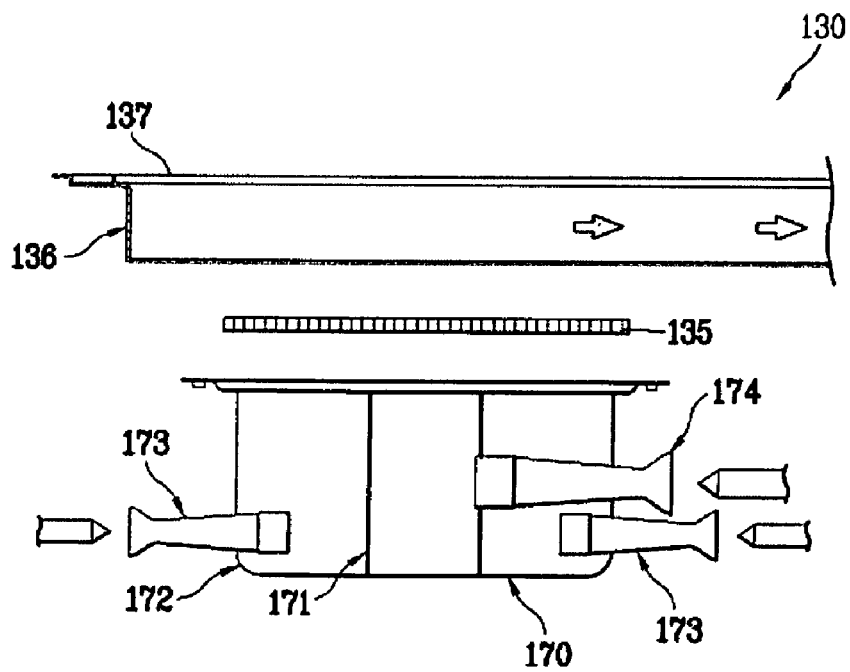
FIG. 9 is a sectional view schematically illustrating important parts of a gas radiation burner according to a fifth embodiment of the present invention.
Figure 10:
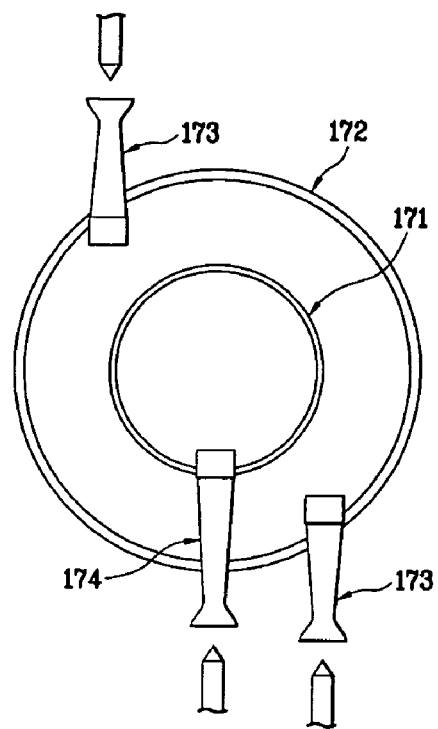
FIG. 10 is a plan view schematically illustrating the structure of a burner pot shown in FIG. 9.

A fifth embodiment of the gas radiation burner according to the present invention will be described with reference to FIGS. 9 and 10. FIG. 9 is a sectional view schematically illustrating important parts of the gas radiation burner according to the fifth embodiment of the present invention. FIG. 10 is a plan view schematically illustrating the structure of a burner pot shown in FIG. 9. As compared to the above described first to third embodiments, the gas radiation burner 130 according to the present embodiment has a difference only in relation with the burner pot 134, but other configurations and reference numerals refer to those of the first to third embodiments.

The gas radiation burner 130 according to the fifth embodiment of the present invention employs a burner pot 170 having a plurality of individual spaces, and a plurality of mixing pipes may be connected to the plurality of individual spaces, respectively, to supply the mixture gas into the individual spaces. In this case, the mixing pipes may be controlled to selectively supply the mixture gas into the corresponding individual spaces on the basis of a desired quantity of heat required by an object to be heated.

Alternatively, a plurality of mixing pipes may be connected to each of the individual spaces. Preferably, the number of the mixing pipes, which are connected to a large-size space, is greater than that of the mixing pipes which are connected to a small-size space. This is to supply an appropriate amount of mixture gas depending on the size of each space.

Although the burner pot 170 according to the present embodiment may include the plurality of individual spaces, for the sake of easy explanation and illustration, the embodiment shown in FIGS. 9 and 10 employs only two spaces defined by an inner burner pot 171 and an outer burner pot 172.

As shown in FIGS. 9 and 10, the burner pot 170 according to the present embodiment may include the inner burner pot 171 for defining a predetermined space in the center of the burner pot 170, and the outer burner pot 172 provided around the inner burner pot 171 for defining a space separately from the space defined by the inner burner pot 171. The gas radiation burner 130 according to the present embodiment may further include an inner mixing pipe 174 for supplying the mixture gas into the inner burner pot 171, and an outer mixing pipe 173 for supplying the mixture gas into the outer burner pot 172. Of course, it will be appreciated that a plurality of inner mixing pipes 174 and a plurality of outer mixing pipes 173 may be provided, respectively.

Preferably, the inner burner pot 171 has a shape corresponding to that of the outer burner pot 172. Specifically, when the outer burner pot 172 has a circular shape, the inner burner pot 171 may also have the same circular shape and be provided inside the outer burner pot 172. In this case, more preferably, the rim of the inner burner pot 171 is spaced apart from the rim of the outer burner pot 172 by a predetermined distance, to obtain a space sufficient for the flow of the mixture gas in the outer burner pot 172 as well as a space sufficient for the flow of the mixture gas in the inner burner pot 171.

The inner and outer mixing pipes 174 and 173 may be coupled to predetermined positions of the lateral portions of the inner and outer burner pots 171 and 172, respectively, such that the mixture gas flows along the inner peripheral surfaces of the inner and outer burner pots 171 and 172. For this, preferably, the inner mixing pipe 174 may be connected to the inner burner pot 171 such that the inner mixing pipe 174 is located adjacent to the inner peripheral surface of the inner burner pot 171, and the outer mixing pipe 173 may be connected to the outer burner pot 172 such that the outer mixing pipe 173 is located adjacent to the inner peripheral surface of the outer burner pot 172. More preferably, the inner and outer-mixing pipes 174 and 173 are connected to the inner and outer burner pots 171 and 172, respectively, in the direction of a tangent. Thereby, the mixture gas supplied from the inner and outer mixing pipes 174 and 173 are able to flow efficiently along the inner peripheral surfaces of the inner and outer burner pots 171 and 172.

Generally, the outer burner pot 172 has a larger interior space than that of the inner burner pot 171. Therefore, it is preferable that the number of the outer mixing pipe 173 connected to the outer burner pot 172 be greater than that of the inner mixing pipe 174 connected to the inner burner pot 171. This is to achieve uniform burning of the mixture gas on the surface of the burner mat 135. If a plurality of outer mixing pipes 173 are provided, as shown in FIG. 10, the mixture gas discharged from the outer mixing pipes 173 is supplied in a direction along the inner peripheral surface of the outer burner pot 172. More preferably, the plurality of outer mixing pipes 173 may be connected to the outer burner pot 172, so as to be symmetrical with one another.

With the present embodiment having the above described configuration, the outer mixing pipe 173 and the inner mixing pipe 174 may be controlled to selectively supply the mixture gas depending on a desired quantity of heat required by an object to be heated. For example, if the object to be heated requires a small quantity of heat, the mixture gas is supplied into the inner burner pot 171 only through the inner mixing pipe 174 such that the burner mat 135 has a small heating surface area. Conversely, if the object to be heated requires a large quantity of heat, the mixture gas is supplied into the inner and outer burner pots 171 and 172 through both the inner and outer mixing pipes 174 and 173 such that the burner mat 135 has a large heating surface area.

In conclusion, the gas radiation burner 130 according to the present embodiment enables a regulation in the heating surface area of the burner mat 3 where the mixture gas burns and the heat of burning is accumulated. This has the effect of varying the quantity of heat to be transferred to an object to be heated.

Figure 11:
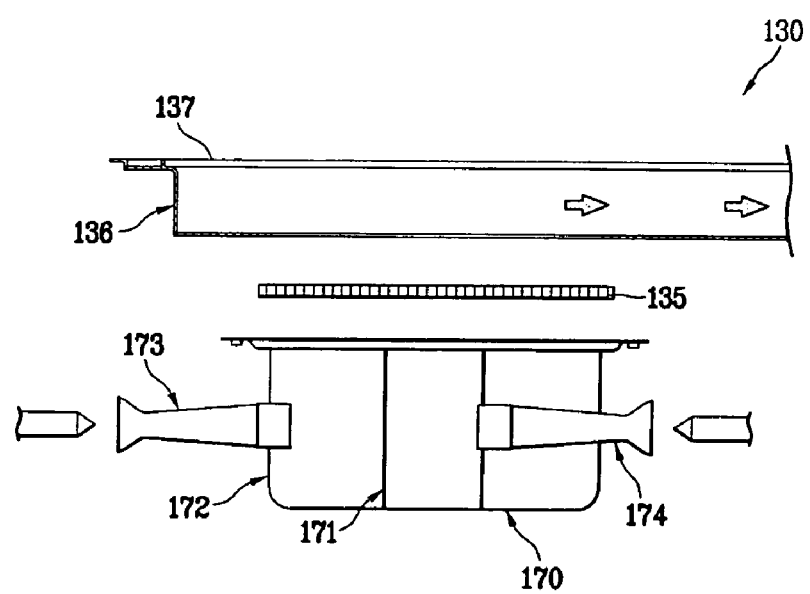
FIG. 11 is a sectional view schematically illustrating a gas radiation burner according to a sixth embodiment of the present invention.
Figure 12:
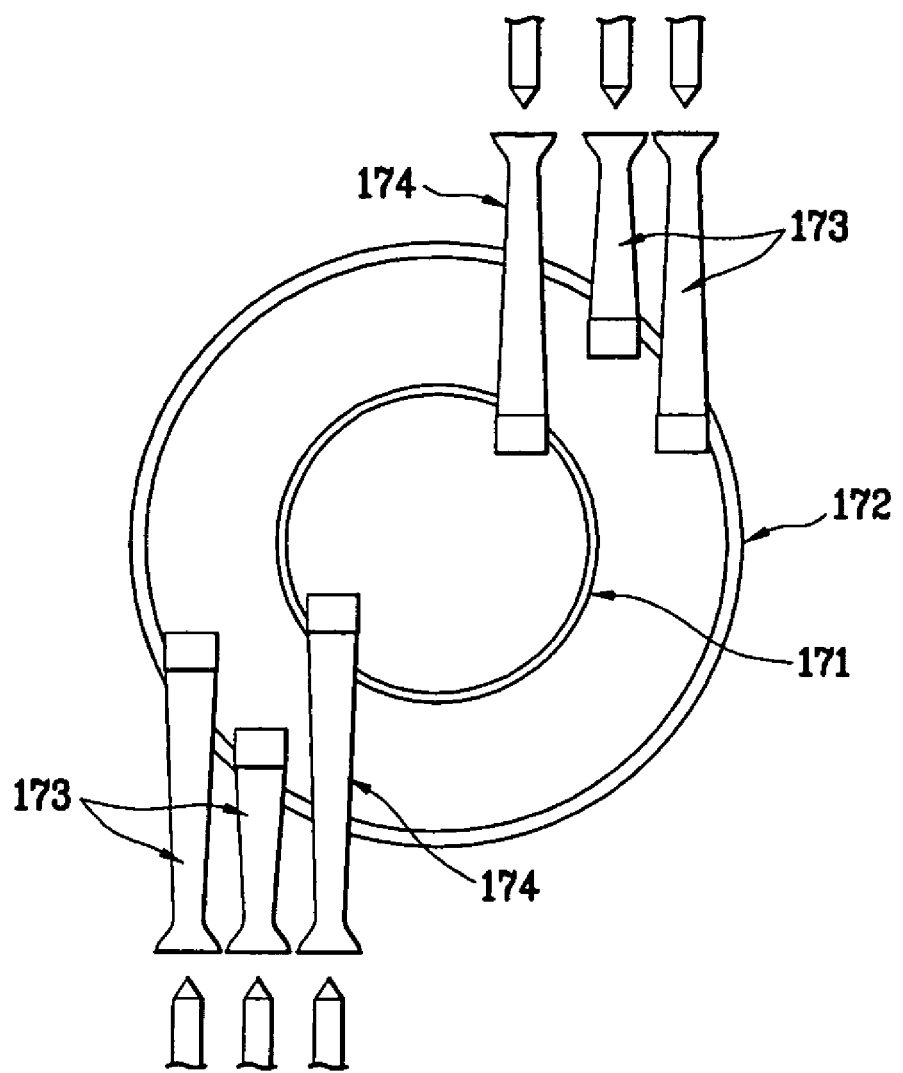
FIG. 12 is a plan view schematically illustrating the structure of a burner pot shown in FIG. 11.

A sixth embodiment of the gas radiation burner according to the present invention will be described with reference to FIGS. 11 and 12. FIG. 11 is a sectional view schematically illustrating the gas radiation burner according to the sixth embodiment of the present invention, and FIG. 12 is a plan view schematically illustrating the structure of a burner pot shown in FIG. 11. As compared to the above fifth embodiment, the gas radiation burner according to the present embodiment has a difference in the number of the inner and outer mixing pipes, but other configurations and reference numerals refer to those of the above fifth embodiment.

As shown in FIGS. 11 and 12, the gas radiation burner 130 according to the sixth embodiment of the present invention includes a plurality of inner mixing pipes 174 and a plurality of outer mixing pipes 173, to achieve a more efficient variation in the quantity of heat.

In conclusion, the gas radiation burner according to the present embodiment has the effect of selectively regulating the amount of mixture gas to be introduced into the outer burner pot 172 and the amount of mixture gas to be introduced into the inner burner pot 171, for the sake of a variation in the quantity of heat. Also, the gas radiation burner according to the present embodiment has the effect of selectively regulating the number of the outer mixing pipes 173 being operated and the number of the inner mixing pipes 174 being operated, for the sake of a variation in the quantity of heat. As a result, according to the present embodiment, the quantity of heat can be regulated with an increased number of stages, and this accomplishes a more efficient variation in the quantity of heat.

Here, in the case where the plurality of inner or outer mixing pipes 174 or 173 are connected to the inner or outer burner pot 171 or 172 such that the inner or outer mixing pipes 174 or 173 are arranged closely adjacent to one another, as shown in FIG. 12, the plurality of inner or outer mixing pipes 174 or 173 preferably have different lengths from one another. This is taken in consideration of the fact that both the inner and outer burner pots 171 and 172 have a smaller size than that of the overall space of the burner pot 170. That is to say, the plurality of inner and outer mixing pipes 174 and 173 having different lengths from one another allow the mixture gas to be supplied into the inner and outer burner pots 171 and 172 at different positions, thereby accomplishing efficient flow of the mixture gas in the inner and outer burner pots 171 and 172.

As apparent from the above description, the gas radiation burner according to the present invention has the following effects.

Firstly, the gas radiation burner can achieve uniform and stable burning of mixture gas on the surface of a burner mat by promoting the burning of the mixture gas, resulting in an improvement in the efficiency of radiation and reducing the amount of exhaust gas.

Secondly, promoting the burning of the mixture gas has the effect of reducing the amount of carbon monoxide that is generated during the burning of the mixture gas and also, improving characteristics of exhaust gas generated during the burning of the mixture gas. Accordingly, the present invention can result in an outstanding reduction in the contamination of environment.

Thirdly, a multiple injection structure using a plurality of mixing pipes can realize a high Turn Down Ratio (TDR), and achieve uniform mixing of the mixture gas even when a burner pot has a small size (i.e. a small height). As a result, the gas radiation burner is suitable for being applied in a built-in product.

Fourthly, it is possible to regulate a heating surface area of the burner mat where the mixture gas burns and heat generated by the burning of the mixture gas is accumulated. This consequently enables a variation in the quantity of heat that will be transferred to an object to be heated as well as a variation in a cooking area of the gas radiation burner.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A gas radiation burner comprising:
a gas supply member for injecting gas;
a plurality of mixing pipes for suctioning air along with the gas injected from the gas supply member to produce mixture gas and injecting the produced mixture gas;
a burner pot for receiving the mixture gas supplied from the mixing pipes;
a burner mat mounted at a top of the burner pot and adapted to emit radiation heat that is generated as the mixture gas supplied from the burner pot burns on the burner mat;
a burner housing located on a top of the burner mat and defining a burning chamber therein; and
at least one flow promotion member for promoting flow of the mixture gas supplied from each mixing pipe into the burner pot,
wherein the flow promotion member is a fan provided in the vicinity of an outlet end of each mixing pipe,
wherein the mixing pipes are connected to a predetermined position of a lateral portion of the burner pot such that the mixture gas supplied from the mixing pipes flows along an inner peripheral surface of the burner pot, and
wherein the plurality of mixing pipes are connected to the burner pot, so as to be symmetrical about the burner pot.

2. The gas radiation burner according to claim 1, wherein the mixing pipes are connected to the burner pot in the direction of a tangent.

3. The gas radiation burner according to claim 2, wherein the mixing pipes are integrally formed with the burner pot.

4. The gas radiation burner according to claim 1, wherein the plurality of mixing pipes supply the mixture gas to flow in a direction.

* * * * *